United States Patent
Cunningham (10) Patent No.: US 7,580,471 B2
(45) Date of Patent: Aug. 25, 2009

(54) NONLINEAR DEVICE DETECTION

(75) Inventor: Christopher C. Cunningham, Belmont, MA (US)

(73) Assignee: Aware, Inc., Bedford, MA (US)

( * ) Notice: Subject to any disclaimer, the term of this patent is extended or adjusted under 35 U.S.C. 154(b) by 671 days.

(21) Appl. No.: 10/921,857

(22) Filed: Aug. 20, 2004

(65) Prior Publication Data

US 2005/0041753 A1    Feb. 24, 2005

Related U.S. Application Data

(60) Provisional application No. 60/497,142, filed on Aug. 21, 2003, provisional application No. 60/497,036, filed on Aug. 21, 2003.

(51) Int. Cl.
*H04B 15/00* (2006.01)

(52) U.S. Cl. .................................................. 375/285

(58) Field of Classification Search ........... 375/220, 375/222, 285, 257, 261; 379/406.06, 406.12
See application file for complete search history.

(56) References Cited

U.S. PATENT DOCUMENTS

| | | | |
|---|---|---|---|
| 5,475,315 A | 12/1995 | Cabot | |
| 6,111,936 A | 8/2000 | Bremer | |
| 6,456,650 B1 * | 9/2002 | Cheng et al. | 375/222 |
| 6,466,649 B1 | 10/2002 | Walance et al. | |
| 6,487,243 B1 * | 11/2002 | Hwang et al. | 375/222 |
| 6,535,580 B1 | 3/2003 | Strauss et al. | |
| 6,658,052 B2 | 12/2003 | Krinsky et al. | |
| 6,748,016 B1 * | 6/2004 | Tzannes | 375/227 |
| 2002/0114383 A1 * | 8/2002 | Belge et al. | 375/222 |

FOREIGN PATENT DOCUMENTS

| | | |
|---|---|---|
| JP | A-HEI 04-175037 | 6/1992 |
| JP | A-HEI 04-181852 | 6/1992 |
| JP | A-HEI 10-500540 | 1/1998 |
| JP | A-2001-519620 | 10/2001 |
| WO | WO 95/26604 | 10/1995 |
| WO | WO 99/18701 | 4/1999 |

OTHER PUBLICATIONS

C. Cunningham et al. "Proposal for a Standard R-Lineprobe State for G.992.3," Aug. 21, 2003.
International Search Report for International (PCT) Patent Application No. PCT/US2004/026912, mailed Dec. 9, 2004.
Written Opinion for International (PCT) Patent Application No. PCT/US2004/026912, mailed Dec. 9, 2004.

(Continued)

*Primary Examiner*—Khanh C Tran
(74) *Attorney, Agent, or Firm*—Sheridan Ross, PC; Jason H. Vick (57) ABSTRACT

Data is collected and interpreted in response to one or more transmitted signals to determine if an interfering device is present. If an interfering device is present, a message is generated and presented to a user indicating, for example, that the installation of a micro-filter is appropriate. The system can then determine if the micro-filter was installed properly and, for example, commence communication or, if the micro-filter(s) did not solve the problem, initiate communication with or contact a technician.

37 Claims, 4 Drawing Sheets

OTHER PUBLICATIONS

International Preliminary Report on Patentabilitiy for International (PCT) Patent Application No. PCT/US2004/026912, mailed Mar. 2, 2006.

First Examination Report for Indian Patent Application No. 549/KOLNP/2006, dated Sep. 27, 2007.

Office Action for European Patent Application No. 04781572.5, dated Dec. 14, 2007.

First Office Action for Chinese Patent Application No. 200480027933.4, mailed Nov. 28, 2008.

Notification of Reasons for Refusal (including translation) for Japanese Patent Application No. 2006-524035, dispatched Mar. 16, 2009.

First Examination Report for Australian Patent Application No. 2004302784, dated Jun. 2, 2009.

Second Office Action (including translation) for Chinese Patent Application No. 200480027933.4, mailed May 22, 2009.

* cited by examiner

NONLINEAR DEVICE DETECTION

RELATED APPLICATION DATA

This application claims the benefit of and priority under 35 U.S.C. §119(e) to U.S. Patent Application Nos. 60/497,142, filed Aug. 21, 2003, entitled "In-Home Device Detection (IDD)," and 60/497,036, filed Aug. 21, 2003, entitled "In-Home Device Detection (IDD)," both of which are incorporated herein by reference in there entirety.

BACKGROUND

1. Field of the Invention

This invention generally relates to communication systems. In particular, an exemplary embodiment of this invention relates to the detection of one or more devices that either directly or indirectly impose nonlinear effects on communication signals.

2. Description of Related Art

One of the most problematic aspects of Digital Subscriber Line (DSL) communications is the in-home environment. One of the most troubling aspects of the in-home environment is the presence of unfiltered devices connected to the telephone line such as telephones, answering machines and fax machines. Many of these devices impose nonlinear behavior on transmitted signals. Harmonic frequencies arising from these nonlinearities generate a disturbance that is often the dominant noise source limiting data rates and loop reach.

SUMMARY

Devices that either directly or indirectly impose nonlinear effects on communication signals will be referred to as nonlinear devices. A device can impose nonlinear behavior on a communication signal in one of many ways. For example, the nonlinear device could receive a communication signal and then actively transmit a nonlinearly distorted version of either the communication signal or its own signal back onto the line where it interferes with the original communication signal. This occurs, for example, when the components with a telephone are forced outside of their liner operating range by, for example, a DSL signal.

Alternatively, a nonlinear device could change the output impedance of a communications channel causing an impedance mismatch at the communications channel interface. This consequently could increase the amount of echo at the interface and drive the front-end of the communications device outside of its own liner operating range.

An exemplary aspect of this invention relates to device detection. In particular, nonlinear devices can be detected, and upon their detection, a message can be generated that recommends corrective action such as the insertion of a micro-filter between the nonlinear device and the communications channel.

For example, in a home environment, DSL communication channels frequently experience disturbances caused by devices that impose nonlinear behavior on transmitted DSL signals. These disturbances can be detected through the detection of harmonic frequencies that are attributable to the nonlinear device(s). Upon the detection of a nonlinear device, corrective action, such as the insertion of a micro-filter between the nonlinear device and the communications channel, can be taken in an effort to increase the data rate and loop reach.

In accordance with an exemplary embodiment, data is collected and interpreted to determine if an interfering device is present. If an interfering device is present, a message is generated and presented to a user indicating, for example, that the installation of a micro-filter is appropriate. The system can then determine if the micro-filter was installed properly and, for example, commence communication or, if the micro-filter(s) did not solve the problem, initiate communication with or contact a technician.

These and other features and advantages of this invention are described in, or are apparent from, the following description of the embodiments.

BRIEF DESCRIPTION OF THE DRAWINGS

The embodiments of the invention will be described in detail, with reference to the following figures, wherein.

DETAILED DESCRIPTION

The exemplary embodiments of this invention will be described in relation to acquiring, forwarding, if appropriate, and analyzing diagnostic information in a communications environment. However, it should be appreciated, that in general, the systems and methods of this invention would work equally well for any type of communication system in any environment.

The exemplary systems and methods of this invention will be described in relation to DSL modems and associated communication hardware, software and communication channels. However, to avoid unnecessarily obscuring the present invention, the following description omits well-known structures and devices that may be shown in block diagram form or otherwise summarized.

For purposes of explanation, numerous details are set forth in order to provide a thorough understanding of the present invention, it should be appreciated however that the present invention may be practiced in a variety of ways beyond the specific details set forth herein. For example, the systems and methods of this invention can generally be applied to any type of communication system within any environment and for the detection of any nonlinear device.

Furthermore, while the exemplary embodiments illustrated herein show the various components of the system collocated, it is to be appreciated that the various components of the system can be located at distant portions of a distributed network, such as a telecommunications network and/or the Internet, or within a dedicated secure, unsecured and/or encrypted system. Thus, it should be appreciated that the components of the system can be combined into one or more devices, such as a modem, or collocated on a particular node of a distributed network, such as a telecommunications network. As will be appreciated from the following description, and for reasons of computational efficiency, the components of the system can be arranged at any location within a distributed network without affecting the operation of the system. For example, the various components can be located in a Central Office (CO or ATU-C) modem, a Customer Premises Modem (CPE or ATU-R), or some combination thereof.

Similarly, the functionality of the system could be distributed between the modem and the associated computing device.

Furthermore, it should be appreciated that the various links, including communications channel 15, connecting the elements can be wired or wireless links, or any combination thereof, or any other known or later developed element(s) that is capable of supplying and/or communicating data to and from the connected elements. The term module as used herein can refer to any known or later developed hardware, software or combination of hardware and software that is capable of performing the functionality associated with an element.

Figure 1:
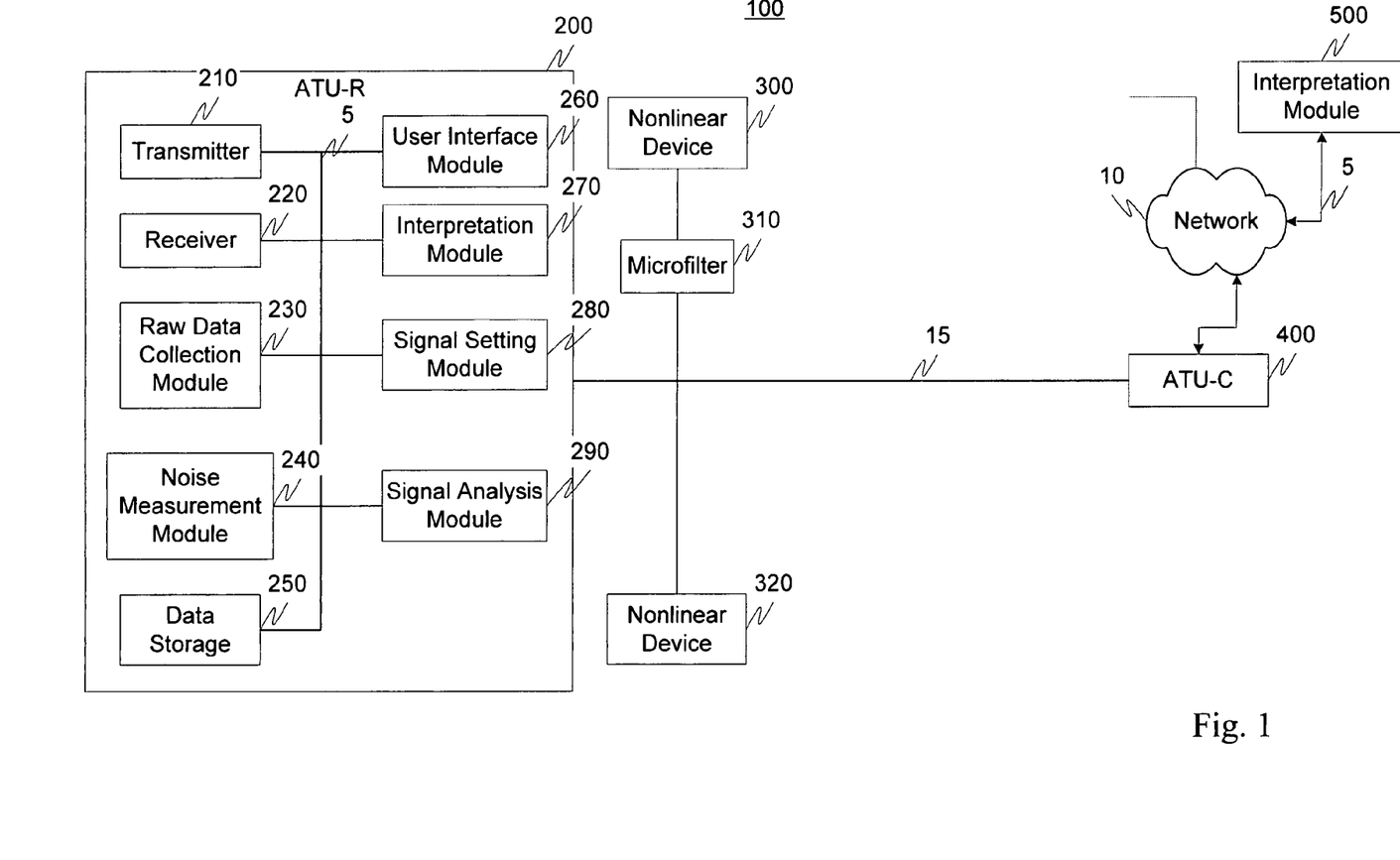
FIG. 1 is a functional block diagram illustrating an exemplary device detection system according to this invention.

FIG. 1 illustrates an exemplary embodiment of the device detection system 100. In particular, the device detection system 100 comprises an ATU-R modem 200, one or more nonlinear devices, such as non linear device 300 and nonlinear device 320, one or more micro-filters 310 inserted between a nonlinear device and the communications channel 15, an ATU-C 400 and an interpretation module 500, connected via network 10 and link 5 to the ATU-C 400. The ATU-R 200 comprises a transmitter 210, a receiver 220, a raw data collection module 230, a noise measurement module 240, data storage 250, a user interface module 260, an interpretation module 270, a signal setting module 280 and a signal analysis module 290, all interconnected via link 5.

Examples of nonlinear devices that may require micro-filters include, but are not limited to, telephones, answering machines, fax machines, home security systems, cable TV set-top boxes, satellite TV set-top boxes, other modems, or in general any device that utilities the communications channel may require a micro-filter. In contrast, the examples of devices that may require attention by a technician are circuits in the Network Interface Device (NID). NID circuits are used for various purposes including transient and surge protection as well as a troubleshooting aid for the telephone company.

In general, an exemplary criterion for evaluating whether a device requires a micro-filter or attention by a technician is typically whether the device has an adverse impact on one or more of the data rate or the loop reach. In exemplary FIG. 1, the loop is the link that extends between the ATU-R 200 and the ATU-C 400.

Devices that impose strong nonlinear behavior on DSL signals are highly likely to adversely impact one or more of the data rate and/or the loop reach. Regardless of where the nonlinearity arises, it is beneficial to detect the nonlinearity so that the condition can be corrected or interference reduced.

In general, the exemplary device detection system 100 performs a raw data collection process and an interpretation process. In an exemplary embodiment, the raw data are collected and interpreted within the ATU-R, such as within the raw data collection module 230, or, for example, in a module connected to the ATU-R, such as within a personal computer. In another exemplary embodiment, the raw data are transported to another remote location for interpretation. This raw data information transportation can be exchanged during a diagnostic transmission mode such as that described in U.S. Pat. No. 6,658,052, entitled "Systems And Methods For Establishing A Diagnostic Transmission Mode And Communicating Over The Same," which is incorporated herein by reference in its entirety.

Since the exemplary method involves two distinct stages, namely the raw data collection stage and the interpretation stage, standardizing the collected data format can be beneficial since it, for example, enables raw data from many different sources to be interpreted by a single entity and enables raw data from one source to be interpreted by many different entities. An exemplary approach to standardizing raw data collection and raw data representation is described in "Proposal For A Standard R-LINEPROBE state for G.992.3," by Cunningham and Tzannes, 21 Aug. 2003, which is also incorporated herein by reference in its entirety. For example, a message can be generated that at least includes raw data information. This message can then be forwarded to a remote entity. More specifically, a DSL modem can transmit a message, for example, to another modem and/or interpretation device, which includes information representing one or more of the device detection signal and/or the received signal. The information can be the raw data that corresponds to the signal received in response to the device detection signal and can include, for example, a sinusoid and signal(s) at frequencies that are multiples of the transmitted frequency. The information within the message can then be interpreted and another message returned to the modem. The returned message can indicate that a microfilter is needed, or, for example, trigger the creation of a message indicating that a microfilter is needed.

An exemplary embodiment of the device detection system 100 measures nonlinearities present within an in-home environment. The exemplary embodiment includes the ATU-R 200 transmitting a signal and receiving the returned signal which is analyzed and compared to various other information such as background noise, and the like.

Device detection is inherently a single-ended methodology, applicable at one end of a communication link without requiring signals to be transmitted from the other end of the link. In general, the device on the other side of the link, i.e., the ATU-C 400, should not be transmitting during the device detection procedure. This allows effects local to the ATU-R 200 to be measured by the ATU-R 200 without interfering signal(s) from the ATU-C 400.

One efficient and simple way to quantify a nonlinearity is to measure the degree to which a nonlinear device generates frequencies other than those that were used to stimulate the device. This is perhaps most clearly observed in a case when a single, pure sinusoid is transmitted. In the case of a memoryless nonlinearity, the received signal includes not only a component at the fundamental frequency, but also components at harmonics of the fundamental frequency. The harmonics can occur at integer multiples of the fundamental frequencies.

It is also possible to transmit more than one sinusoid simultaneously. In this exemplary embodiment, the received signal includes not only components at the fundamental frequencies, but also components and harmonics of the fundamental as well as intermodulation products, also referred to as sum-and-difference frequencies. Intermodulation products occur as sums-and-differences of integer multiples of the fundamental frequencies.

The term harmonic frequencies will be used to refer to both the frequencies of single-tone harmonics and the frequencies of intermodulation products in the case of multiple tones. The power at these frequencies while transmitting the device detection signals will be referred to as the harmonic power. The term fundamental frequencies will be used to refer to the frequencies at which the device detection signal(s) were transmitted.

The power of the transmitted device detection signal(s) should be set high enough by the signal setting module 280 such that it elicits nonlinear behavior from external devices that impose nonlinear behavior when exposed to data-carrying DSL signals, but the power should not be set so high that it elicits nonlinear behavior in the front-end of the ATU-R itself to the extent that the effects of the external device-induced nonlinearities are masked. The ATU-R receiver gains should be set with the same considerations in mind.

The device detection system 100 is able to characterize the effects that external devices have on the upstream and downstream DSL signals. To separate these effects from other additive noise present on the line, the received response to the transmitted device detection signal(s) can be averaged over a particular time interval with the cooperation of the signal analysis module 290.

In addition to the response to the transmitted probing signal(s), the average background noise at the same frequencies should be measured to determined how much of the received response is caused by the probing signal itself verses the received response from external sources, such as radio frequency interference (RFI).

After all or a portion of the data collection process is complete, the process of interpreting the results commences. In particular, interpretation is the process of converting the raw data into meaningful results, such as "a micro-filter is needed" or "a micro-filter is not needed," and/or "a technician is required."

Interpretation utilizes as its inputs knowledge of the transmitted device detection signal(s), the received response to the transmitted device detection signal(s), the received response relative to quiet background noise at the same frequencies, and pre-stored threshold(s).

The data are typically collected by the ATU-R 200 while running a data collection routine while holding all programmable components in the front-end of the ATU-R constant during the data collection process. This allows the data collection and interpretation processes to be simplified. These fixed front-end settings should be chosen to minimize nonlinear effects when there are no external devices connected that degrade data rate, while at the same time maximizing nonlinear effects when there are deleterious devices connected that degrade data rates.

In operation, one or more mechanisms should be adopted to ensure that the ATU-C 400 side of the DSL communication system is not transmitting during the device detection process. This could involve the ATU-R 200 actively communicating to the ATU-C that is should stop transmitting, or waiting for the ATU-C 400 to go quiet.

With the ATU-C and the transmitter 210 quiet, the noise measurement module 240 measures the background noise. The noise measurement module 240 then averages the real and imaginary components of the background noise at the same frequencies as the harmonic frequencies of the device detection signal(s), but they are received when the modem is quiet, rather than when the device detection signal(s) are being transmitted. The averaging time can be chosen so as to minimize the effect of zero-mean uncorrelated background noise. It should be appreciated that the signal amplitudes are averaged, not the power, so the average will tend toward zero if the background noise has a zero mean. This can be accomplished in the time domain, or it can be done in the frequency domain by averaging the real and imaginary part separately for each frequency.

Next, the transmitter 210 transmits device detection signal(s) while receiving, via the receiver 220, at the same frequencies as during background noise reception. It is beneficial for the signal analysis module 290 to average the received signal amplitudes rather than their power. The device detection signals can be comprised of a sinusoid at a single frequency or multiple sinusoids at multiple frequencies. It should be appreciated that any practical waveform can be decomposed into a combination of sinusoids with the appropriate amplitudes and phases, so the choice of a specific device detection signal(s) can be tailored to the constraints of, for example, a particular application.

It should be appreciated that the background noise reception and measurement may occur before or after the harmonic reception.

Since the exemplary methodology involves two distinct stages, namely the raw data collection and interpretation stages, standardizing the data collection process and raw data formatting can be beneficial because, for example, it enables raw data from many different sources to be interpreted by a single entity and it enables raw data from one source to be interpreted by many different entities, such as, for example, one or more interpretation modules 500. In a first exemplary embodiment, the raw data is collected, with the cooperation of the raw data collection module 230, the noise measurement module 240, the signal analysis module 290 as well as the transmitter 210 and receiver 220. The raw data is then interpreted with the cooperation of the interpretation module 270 and stored in the data storage 250.

In a second exemplary embodiment, the raw data can be transported, with the cooperation of the transmitter 210, to another location, such as the interpretation module 500, via, for example, the communications channel, the ATU-C 400, and one or more networks 10 over links 5.

The interpretation module 270 determines the extent of nonlinearity in the environment based on signal(s) transmitted by transmitter 210. In particular, the interpretation module 270 compares the harmonic power with the background noise power at the harmonic frequencies. If the background noise power is sufficiently high at a given frequency, then the measurement at that frequency can be thrown out or weighted accordingly. In general, however, higher background noise reduces the confidence of the device detection process.

The interpretation module 270 also compares the harmonic power to a determined threshold(s) for a given type of ATU-R. The comparisons may be done all at once by integrating all harmonic power across all received frequencies, or may be accomplished on a frequency-by-frequency basis with some sort of, for example, voting or weighting strategy. If the harmonic power is higher than the threshold(s), then the device detection system 100 is capable of outputting, with the cooperation of user interface module 260, an indication that there is a nonlinearity that either requires a micro-filter or requires the attention of a technician. For example, the user interface module 260 can generate and display, with the cooperation of a display device (not shown) and, for example, a personal computer (not shown), a message to the user indicating that a micro-filter is required. However, in general, the user interface module 260 can use any means for communicating the need for a micro-filter to the user, such as status lights, a graphical user interface, one or more audible tones, or the like. Alternatively, the user interface module 260 can inform the user and/or a technician that technical assistance is required.

The exemplary device detection system 100 has been tested and validated. In one implementation of the exemplary system, the probing signal comprises three sinusoids transmitted simultaneously at three separate frequencies. In another implementation, only one sinusoid is transmitted. In both implementations, both the background noise and received response to the transmitted signals are measured, stored, and analyzed. The following description applies to the single-sinusoid implementation, but it applies as well to multiple-sinusoid implementations.

Specifically, during device detection signal transmission, the ATU-C is not transmitting, and the received signal is averaged for a duration that allows for sufficient background noise reduction. One example is 1024 ADSL frames (approximately ¼ of a second) of averaging for a noise reduction factor of approximately 30 dB.

At a different interval, the ATU-R and the ATU-C are both quiet, and the received signal is averaged for a duration that allows for sufficient background noise reduction, one example being 1024 ADSL frames (approximately ¼ of a second) of averaging for a noise reduction factor of approximately 30 dB.

The device detection transmitted signal response IDD_RX_TONE(f) is the average signal received at the harmonic frequencies in response to the transmitted device detection signal. The device detection quiet response IDD_RX_QUIET(f) is the average signal received at the same frequencies as the IDD_RX_TONE(f) when both the ATU-R and the ATU-C are quiet.

While transmitting the single-sinusoid device detection signal at frequency $S_{IDD}$, the ATU-R receiver averages the received signal at each of $N_{IDD}$ frequencies which are multiples of $S_{IDD}$, to obtain IDD_RX_TONE(f). $S_{IDD}$ is a frequency index of the tone transmitted during device detection. $N_{IDD}$ is the number of harmonics that are received. In practice, it can be beneficial to receive and store the received signal at least at the second harmonic (twice the fundamental frequency) and third harmonic (three times the fundamental frequency).

The real and imaginary components of each received frequency are averaged separately. Averaging the real and imaginary parts separately reduces the zero-mean, non-coherent noise at each of the received frequencies, which provides better visibility into the received signals contributable to the nonlinear response to the device detection. While the ATU-R transmitter is quiet, the ATU-R receiver averages the background noise at each of the same $N_{IDD}$ frequencies to obtain IDD_RX_QUIET(f). The real and imaginary components of each frequency are averaged separately.

To mitigate the effects of inter-symbol and inter-carrier interference, the receiver frames samples so that all significant transients are excluded from each received symbol used in the computation of IDD_RX_TONE(f) and IDD_RX_QUIET(f).

The ATU-R receiver front-end is set to the same configuration when IDD_RX_TONE(f) is measured as when IDD_RX_QUIET(f) is measured. The ATU-R receiver front-end always is set to the same configuration every time that IDD_RX_TONE(f) and IDD_RX_QUIET(f) are measured, regardless of the load attached to the receiver. When determining this fixed receiver configuration, a best effort was made to minimize nonlinear effects within the ATU-R receiver under favorable operating conditions while at the same time providing enough dynamic range to resolve non-linearities that might be caused by external devices attached to the line. The echo canceller was turned off so that linear and nonlinear echo are included in IDD_RX_TONE(f). A best effort was made to utilize the dynamic range for IDD_RX_TONE(f).

IDD_RX_TONE(f) and IDD_RX_TONE(f) are each represented as ($2*N_{IDD}$) values, which include the average real and imaginary parts of $N_{IDD}$ received frequencies.

As an example of how to encode the received signals to digital values, the average real and imaginary parts of each received frequency in IDD_RX_TONE(f) and IDD_RX_TONE(f) can be represented as 16-bit 2's complement signed integers.

The output of interpretation is an indication of whether a microfilter or technician is "needed," "not needed," or perhaps somewhere in-between, or perhaps unknown because of unfavorable line conditions. For example, the interpretation module 270, in cooperation with the user interface module, can report that a microfilter or technician is "needed," "may be needed," "not needed," or is "unknown." Other indicators are also possible.

First, the power is computed at each of the received frequencies for the average background noise data, for the average received responses to transmitted signals.

Next, the background noise power is integrated across all received tones. This yields a single scalar that represents the "aggregate power of the background noise in the harmonic tones after averaging for several frames." Let this scalar be known as B.

The tone harmonic power is integrated across all received tones. This yields a single scalar that represents the "aggregate power caused by the nonlinearities in the harmonic tones after averaging for several frames." Let this scalar be known as N. It is possible to evaluate the results in another way, such as on a tone-by-tone basis with some sort of voting strategy, but this is one example of how to quantify the power caused by the nonlinearity.

If the value of B is sufficiently high, then the background noise is masking the ability to determine whether an external device is connected that might degrade data rates. In this case, the result of interpretation might be that the answer is "unknown" or that the "confidence is low." For example, say that the value $T_0$ is known to be the aggregate received power when a known nonlinear device is connected without a filter; then it is not practical to measure the effect of this nonlinear device if B is significantly larger than $T_0$, in which case it is unknown whether the device is present or needs to be filtered. Thresholds such as $T_0$ can be measured and pre-stored for the types of devices that are to be detected.

If the value of N is approximately equal to the value of B, then a nonlinear device probably is not connected without a filter. In this case, the result of interpretation might be that "no devices are detected". If the value of N is significantly higher than that of B, then an external device probably is connected and data rates are likely to be degraded by it. In this case, the result of interpretation might be that "a harmful device is detected." Although the aforementioned results included only three discrete outcomes, it should be noted that additional degrees of detection and/or confidence could be reported depending on the relative values of B and N. Thresholds that distinguish these different outcomes can be measured and pre-stored relative to the types of devices that are to be detected.

Figure 2:
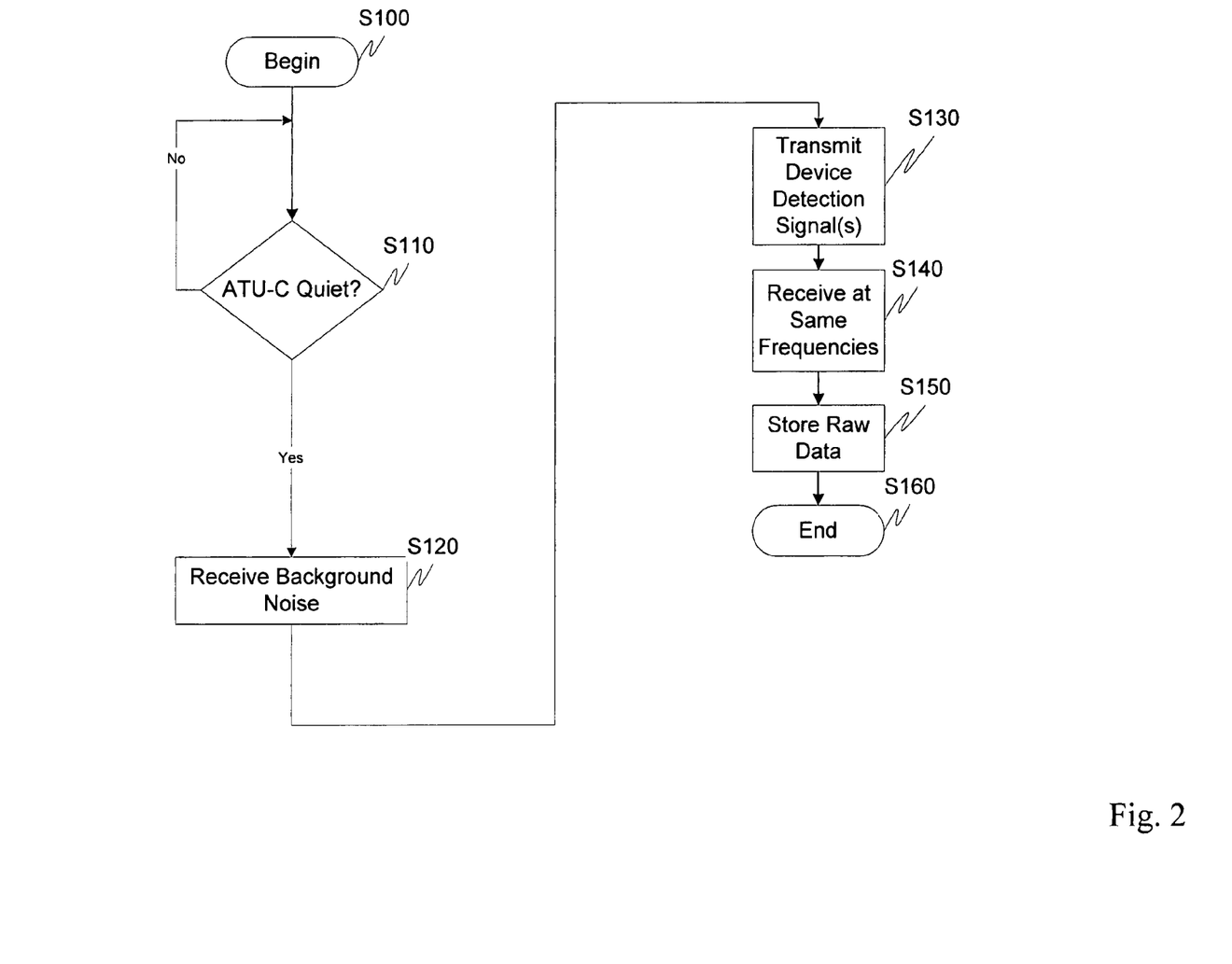
FIG. 2 is a flowchart outlining an exemplary method of collecting data according to this invention.

FIG. 2 outlines an exemplary method of collecting the raw data in accordance with an exemplary embodiment of this invention. In particular, control begins at step S100 and continues to step S110. In step S110, a determination is made whether the ATU-C is quiet. If the ATU-C is not quiet, control returns back to step S110. Otherwise, control continues to step S120.

In step S120, the background noise is received and measured. Next, in step S130, one or more device detection signals are transmitted. While the device detection signals are transmitted, in step S140, the return device detection signal is received at the same frequencies. It should be appreciated however, that the background noise detection in step S120, can also be performed after the transmission of the device detection signal(s).

In step S150, the raw data is stored and control continues to step S160 where the control sequence ends.

Figure 3:
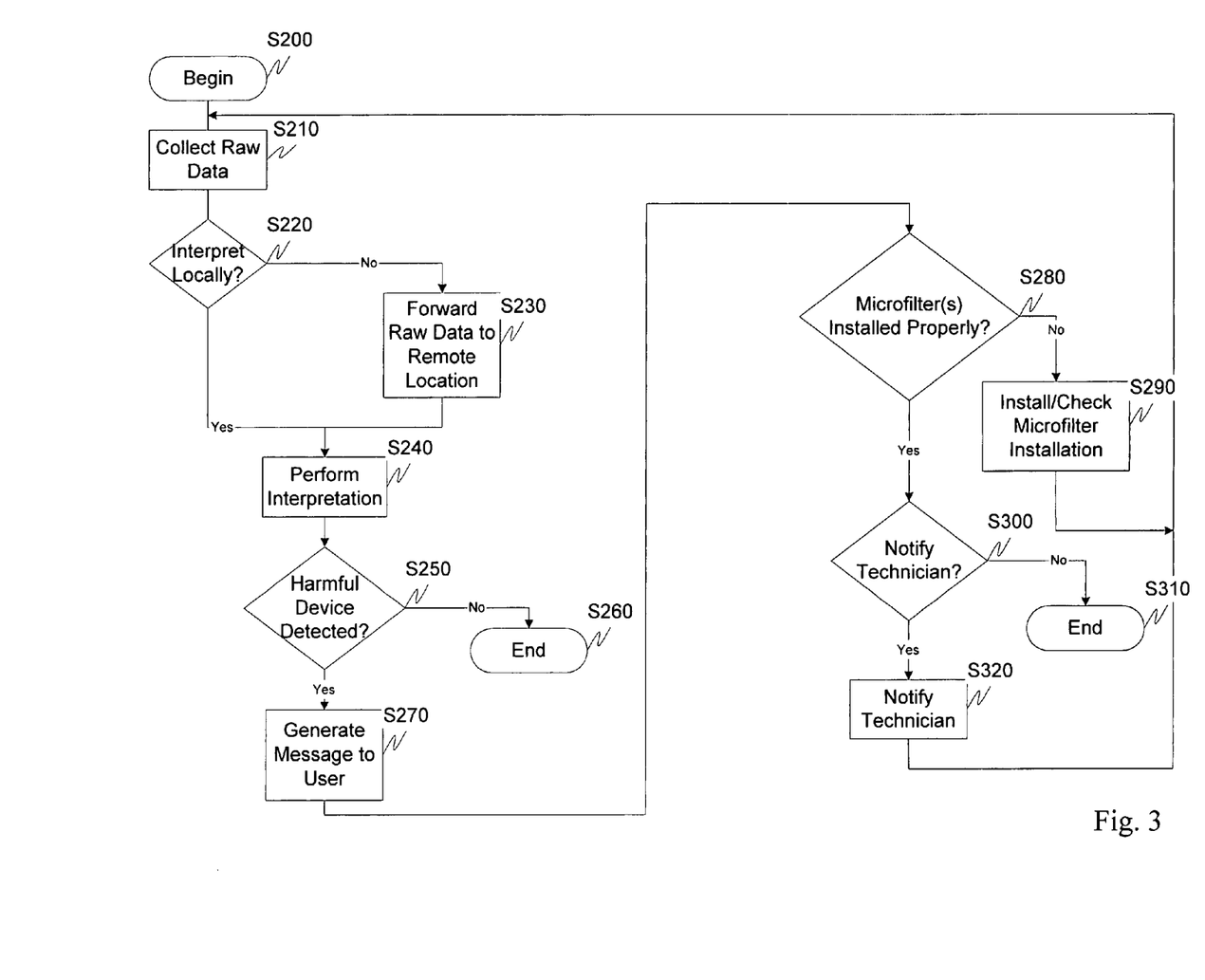
FIG. 3 is a flowchart outlining an exemplary method of determining the presence of an interfering device according to this invention.

FIG. 3 illustrates an exemplary method of performing the raw data interpretation according to an embodiment of this invention. In particular, control begins in step S200 and continues to step S210. In step S210, the raw data is collected.

Next, in step S220, a determination is made whether the raw data should be interpreted locally. If the raw data is to be interpreted locally, control jumps to step S240. Otherwise, control continues to step S230 where the raw data is forwarded to one or more remote locations for interpretation. Control then continues to step S240.

In step S240, interpretation of the raw data is performed. Next, in step S250, a determination is made whether an interfering device(s) is present based on the interpretation. If an interfering device is not present, control continues to step S260 where the control sequence ends. Otherwise, control jumps to step S270.

In step S270, a message is generated and forwarded to the user indicating that an interfering device is present. The message can include instructions for how to install a micro-filter and, for example, provide a list to the user of devices that may be suspect. Control then continues to step S280.

In step S280, a determination is made whether the micro-filter(s) have been installed properly. If the micro-filters have been installed properly, control continues to step S300. Otherwise, control continues to step S290 where a supplemental message can be generated for the user requesting the further installation and/or checking of the existing installed micro-filters. Control then continues back to step S210.

In step S300, a determination is made whether to contact a technician. If a technician is to be contacted control continues to step S320 where a technician is contacted with control returning to step S210. Otherwise the control sequence ends.

Figure 4:
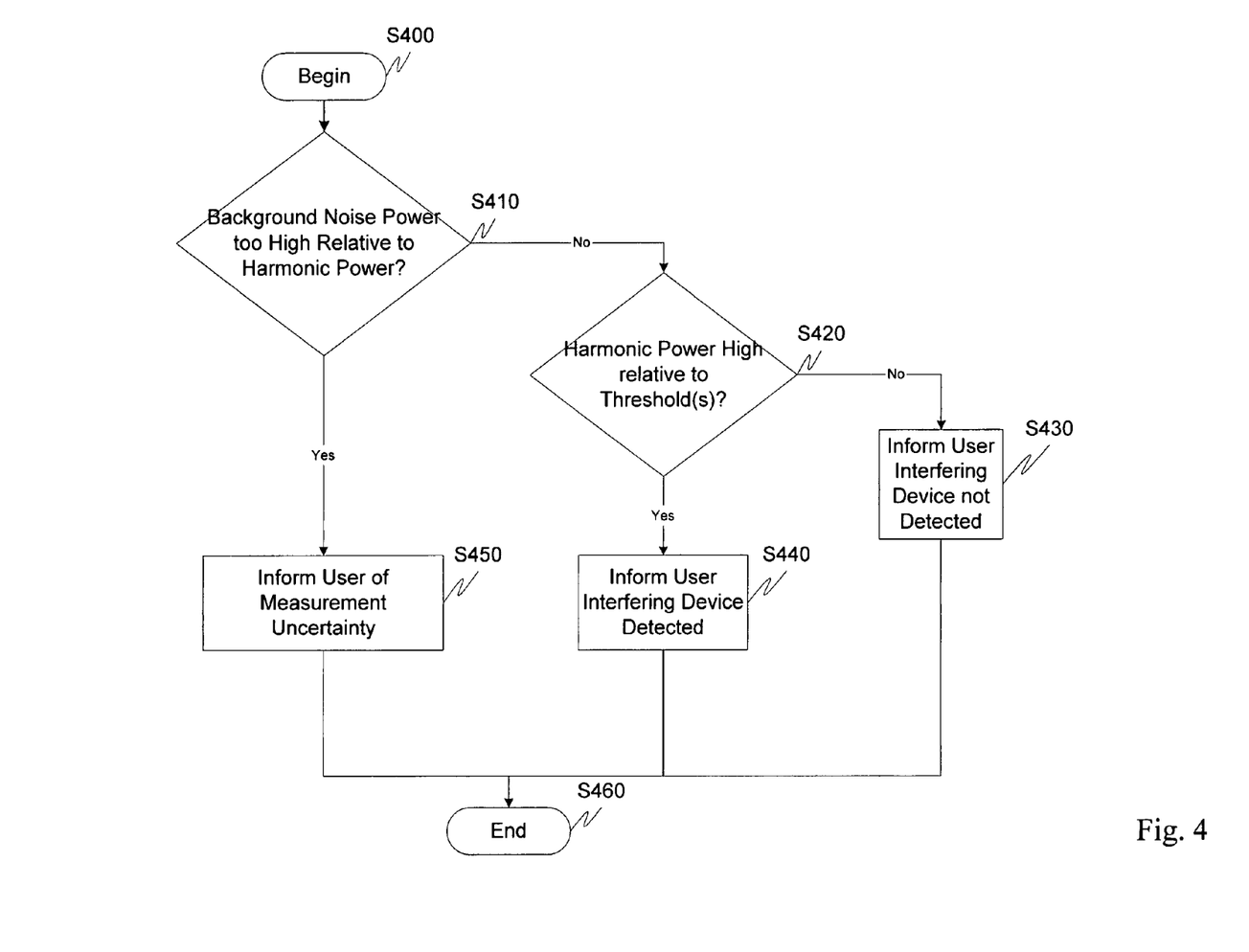
FIG. 4 is a flowchart outlining an exemplary method of interpreting the collected data according to this invention.

FIG. 4 illustrates an exemplary interpretation method according to this invention. In particular, control begins in step S400 and continues to step S410. In step S410, a determination is made whether the background noise powers to high relative to the harmonic power. If the background noise power is to high, control jumps to step S450 where the user is informed that there may be measurement uncertainties. Control then continues to step S460 where the control sequence ends.

Otherwise, control continues to step S420 where a determination is made whether the harmonic power is high relative to one or more thresholds. If the comparison is yes, control continues to step S440 where the user is informed that an interfering device has been detected. Control then continues to step S460 where the control sequence ends.

Otherwise, control continues to step S430 where the user is informed that an interfering device has not been detected. Control then continues to step S460 where the control sequence ends.

The above-described system can be implemented on wired and/or wireless telecommunications devices, such a modem, a multicarrier modem, a DSL modem, an ADSL modem, an XDSL modem, a VDSL modem, a multicarrier transceiver, a wired and/or wireless wide/local area network system, a satellite communication system, or the like, or on a separate programmed general purpose computer having a communications device. Additionally, the systems, methods and protocols of this invention can be implemented on a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, modem, transmitter/receiver, or the like. In general, any device capable of implementing a state machine that is in turn capable of implementing the methodology illustrated herein can be used to implement the various communication methods, protocols and techniques according to this invention.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The communication systems, methods and protocols illustrated herein however can be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed methods may be readily implemented in software executed on programmed general-purpose computer, a special purpose computer, a microprocessor, or the like. In these instances, the systems and methods of this invention can be implemented as program embedded on personal computer such as JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications transceiver and operations support system.

It is therefore apparent that there has been provided, in accordance with the present invention, systems and methods for exchanging communication parameters. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

The invention claimed is:

1. A method of detecting one or more unfiltered devices that interfere with communication signals comprising:
   transmitting a device detection signal at a frequency S from a device;
   measuring a received signal at frequencies that are multiples of the transmitted frequency S and at frequencies that are sums and differences of multiples of the transmitted frequencies at the device;
   detecting the presence of the one or more unfiltered devices that interfere with the communication signals; and
   instructing a user to install one or more microfilters.

2. The method of claim 1, further comprising transmitting additional signals concurrently and one or more of measuring received signals at frequencies that are multiples of the transmitted frequencies and at frequencies that are sums and differences of multiples of the transmitted frequencies.

3. The method of claim 1, further comprising:
   measuring background noise on a communications channel; and
   comparing the received signal to one or more predetermined thresholds.

4. The method of claim 1, wherein the device detection signal is a sinusoid.

5. The method of claim 1, wherein the one or more unfiltered devices are telephones, answering machines, fax machines, home security systems, cable TV set-top boxes, satellite TV set-top boxes and other modems.

6. The method of claim 1, further comprising determining if background noise is higher than a harmonic.

7. The method of claim 1, further comprising determining if harmonic power is higher than one or more predetermined thresholds.

8. The method of claim 1, wherein the method is performed by a multicarrier modem.

9. A method of detecting one or more unfiltered devices that interfere with communication signals comprising:
   transmitting a device detection signal at a frequency S from a device;
   measuring a received signal at frequencies that are multiples of the transmitted frequency S and at frequencies that are sums and differences of multiples of the transmitted frequencies at the device;
   detecting the presence of the one or more unfiltered devices that interfere with the communication signals; and
   informing a user that one or more devices that interfere with communications have been detected.

10. A method of detecting one or more unfiltered devices that interfere with communication signals comprising:
    transmitting a device detection signal at a frequency S from a device;
    measuring a received signal at frequencies that are multiples of the transmitted frequency S and at frequencies that are sums and differences of multiples of the transmitted frequencies at the device;
    detecting the presence of the one or more unfiltered devices that interfere with the communication signals; and
    waiting for a transmitting modem to go quiet.

11. A method of detecting one or more unfiltered devices that interfere with communication signals comprising:
    transmitting a device detection signal at a frequency S from a device;
    measuring a received signal at frequencies that are multiples of the transmitted frequency S and at frequencies that are sums and differences of multiples of the transmitted frequencies at the device;
    detecting the presence of the one or more unfiltered devices that interfere with the communication signals; and
    transmitting raw data corresponding to the measured received signal to an interpreter.

12. A method of detecting one or more unfiltered devices that interfere with communication signals comprising:
    transmitting a device detection signal at a frequency S from a device;
    measuring a received signal at frequencies that are multiples of the transmitted frequency S and at frequencies that are sums and differences of multiples of the transmitted frequencies at the device;
    detecting the presence of the one or more unfiltered devices that interfere with the communication signals; and
    generating a message to a user with corrective action instructions.

13. A system configured to detect one or more unfiltered devices that interfere with communication signals comprising:
    a transmitter adapted to transmit a device detection signal at a frequency S from a device;
    a signal analysis module adapted to measure a received signal at frequencies that are multiples of the transmitted frequency S and at frequencies that are sums and differences of multiples of the transmitted frequencies at the device;
    an interpretation module adapted to detect the presence of the one or more unfiltered devices that interfere with the communication signals; and
    a user interface that instructs the user to install one or more microfilters.

14. The system of claim 13, further comprising a user interface module adapted to inform a user that one or more devices that interfere with communications have been detected.

15. The system of claim 13, wherein the transmitter further transmits additional signals concurrently and a receiver in cooperation with the signal analysis module are adapted to one or more of measuring received signals at frequencies that are multiples of the transmitted frequencies and measuring received signals that are at frequencies that are sums and differences of multiples of the transmitted frequencies.

16. The system of claim 13, further comprising a noise measurement module adapted to measure background noise on a communications channel.

17. The system claim 13, wherein the device detection signal is a sinusoid.

18. The system of claim 13, wherein the one or more unfiltered devices are telephones, answering machines, fax machines, home security systems, cable TV set-top boxes, satellite TV set-top boxes and other modems.

19. The system of claim 13, wherein the system is associated with a multicarrier modem.

20. A system configured one or more unfiltered devices that interfere with communication signals comprising:
    a transmitter adapted to transmit a device detection signal at a frequency S from a device;
    a signal analysis module adapted to measure a received signal at frequencies that are multiples of the transmitted frequency S and at frequencies that are sums and differences of multiples of the transmitted frequencies at the device; and
    an interpretation module adapted to detect the presence of the one or more unfiltered devices that interfere with the communication signals, wherein the transmitter is further adapted to wait for a transmitting modem to go quiet.

21. A system configured to detect one or more unfiltered devices that interfere with communication signals comprising:
    a transmitter adapted to transmit a device detection signal at a frequency S from a device;
    a signal analysis module adapted to measure a received signal at frequencies that are multiples of the transmitted frequency S and at frequencies that are sums and differences of multiples of the transmitted frequencies at the device;
    an interpretation module adapted to detect the presence of the one or more unfiltered devices that interfere with the communication signals; and
    a raw data collection module adapted to collect and transmit raw data corresponding to the measured received signal to one or more remote interpretation modules.

22. A system configured to detect one or more unfiltered devices that interfere with communication signals comprising:
    a transmitter adapted to transmit a device detection signal at a frequency S from a device;
    a signal analysis module adapted to measure a received signal at frequencies that are multiples of the transmitted frequency S and at frequencies that are sums and differences of multiples of the transmitted frequencies at the device;

an interpretation module adapted to detect the presence of the one or more unfiltered devices that interfere with the communication signals; and a noise measurement module adapted to determine if background noise is higher than a harmonic.

23. A system configured to detect one or more unfiltered devices that interfere with communication signals comprising:
- a transmitter adapted to transmit a device detection signal at a frequency S from a device;
- a signal analysis module adapted to measure a received signal at frequencies that are multiples of the transmitted frequency S and at frequencies that are sums and differences of multiples of the transmitted frequencies at the device;
- an interpretation module adapted to detect the presence of the one or more unfiltered devices that interfere with the communication signals, wherein the signal analysis module is further adapted to determine if harmonic power is higher than one or more predetermined thresholds.

24. A system configured to detect one or more unfiltered devices that interfere with communication signals comprising:
- a transmitter adapted to transmit a device detection signal at a frequency S from a device;
- a signal analysis module adapted to measure a received signal at frequencies that are multiples of the transmitted frequency S and at frequencies that are sums and differences of multiples of the transmitted frequencies at the device;
- an interpretation module adapted to detect the presence of the one or more unfiltered devices that interfere with the communication signals; and
- a user interface module adapted to generate a message to a user with corrective action instructions.

25. A means for detecting one or more unfiltered devices that interfere with communication signals comprising:
- means for transmitting a device detection signal at a frequency S from a device;
- means for measuring a received signal at frequencies that are multiples of the transmitted frequency S and at frequencies that are sums and differences of multiples of the transmitted frequencies at the device;
- means for detecting the presence of the one or more unfiltered devices that interfere with the communication signals; and
- means for instructing a user to install one or more microfilters.

26. The means of claim 25, further comprising means for transmitting additional signals concurrently and one or more of measuring received signals at frequencies that are multiples of the transmitted frequencies and at frequencies that are sums and differences of multiples of the transmitted frequencies.

27. The means of claim 25, further comprising means for measuring background noise on a communications channel.

28. The means of claim 25, wherein the device detection signal is a sinusoid.

29. The means of claim 25, wherein the one or more unfilted devices are telephones, answering machines, fax machines, home security systems, cable TV set-top boxes, satellite TV set-top boxes and other modems.

30. The means of claim 25, further comprising means for determining if background noise is higher than a harmonic.

31. The means of claim 25, further comprising means for determining if harmonic power is higher than one or more predetermined thresholds.

32. The means of claim 25, wherein the means is performed by a multicarrier modem.

33. A means for detecting one or more unfiltered devices that interfere with communication signals comprising:
- means for transmitting a device detection signal at a frequency S from a device;
- means for measuring a received signal at frequencies that are multiples of the transmitted frequency S and at frequencies that are sums and differences of multiples of the transmitted frequencies at the device;
- means for detecting the presence of the one or more unfiltered devices that interfere with the communication signals; and
- means for informing a user that one or more devices that interfere with communications have been detected.

34. A means for detecting one or more unfiltered devices that interfere with communication signals comprising:
- means for transmitting a device detection signal at a frequency S from a device;
- means for measuring a received signal at frequencies that are multiples of the transmitted frequency S and at frequencies that are sums and differences of multiples of the transmitted frequencies at the device;
- means for detecting the presence of the one or more unfiltered devices that interfere with the communication signals; and
- means for waiting for a transmitting modem to go quiet.

35. A means for detecting one or more unfiltered devices that interfere with communication signals comprising:
- means for transmitting a device detection signal at a frequency S from a device;
- means for measuring a received signal at frequencies that are multiples of the transmitted frequency S and at frequencies that are sums and differences of multiples of the transmitted frequencies at the device;
- means for detecting the presence of the one or more unfiltered devices that interfere with the communication signals; and
- means for transmitting raw data corresponding to the measured received signal to an interpreter.

36. A means for detecting one or more unfiltered devices that interfere with communication signals comprising:
- means for transmitting a device detection signal at a frequency S from a device;
- means for measuring a received signal at frequencies that are multiples of the transmitted frequency S and at frequencies that are sums and differences of multiples of the transmitted frequencies at the device;
- means for detecting the presence of the one or more unfiltered devices that interfere with the communication signals; and
- means for generating a message to a user with corrective action instructions.

37. In a multicarrier modulation transceiver, a method of detecting one or more unfiltered devices comprising:
- transmitting at least one tone at a first subcarrier index $S_{IDD}$ from a device;
- measuring a received signal of at least one received tone at a second subcarrier index that is multiple of the first subcarrier index $S_{IID}$ and at frequencies that are sums and differences of multiples of the transmitted frequencies at the device; and
- determining whether one or more of the unfiltered devices require a microfilter.

* * * * *

UNITED STATES PATENT AND TRADEMARK OFFICE
CERTIFICATE OF CORRECTION

PATENT NO.        : 7,580,471 B2         Page 1 of 1
APPLICATION NO.   : 10/921857
DATED             : August 25, 2009
INVENTOR(S)       : Christopher C. Cunningham It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1288 days.

Signed and Sealed this

Fourteenth Day of December, 2010

David J. Kappos
*Director of the United States Patent and Trademark Office*